No. 761,998.

Patented June 7, 1904.

UNITED STATES PATENT OFFICE.

EDUARD RITSERT AND WILHELM EPSTEIN, OF FRANKFORT-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

ALKYL ESTERS OF 3-4-DIAMIDO-BENZOIC ACID AND PROCESS OF MAKING SAME.

SPECIFICATION forming part of Letters Patent No. 761,998, dated June 7, 1904.

Application filed September 3, 1903. Serial No. 171,804. (Specimens.)

*To all whom it may concern:*

Be it known that we, EDUARD RITSERT, Ph. D., and WILHELM EPSTEIN, Ph. D., both citizens of the Empire of Germany, residing at Frankfort-on-the-Main, Germany, have invented certain new and useful Improvements in the Manufacture of Alkyl Esters of 3-4-Diamido-Benzoic Acid, of which the following is a specification.

The esters of amido-carboxylic acid successfully introduced as a non-poisonous substitute for cocaine have the drawback that the bases are hardly soluble even in water, while their soluble salts have an acid reaction and are therefore unsuitable for subcutaneous injections. We have found that by introducing a second amido group into the esters of the amido-benzoic acid not only the solubility, but also the basicity is essentially increased, while the anesthetic action is maintained. The ethyl ester of 3-4-diamido-benzoic acid, for instance, dissolves readily in cold water, if the equivalent of half a molecule of hydrochloric acid be added—that is to say, the fourth part of that requisite for the neutral salt. The reaction of this solution is now very feebly acid. The corresponding methyl ester is sufficiently soluble in cold water without any addition. A one-per-cent. solution of it keeps quite clear at 15° centigrade, and when of absolutely neutral reaction it is a good anesthetic.

The present invention therefore relates to the manufacture of the esters of 3-4-diamido-benzoic acid—for instance, by nitrating and reducing the esters of para-amido-benzoic acid or by etherifying and reducing 3-nitro-4-amido-benzoic acid.

Example I: One hundred and sixty-five grams of ethyl-para-amido benzoate are heated in a reflux apparatus for four hours with one hundred and fifty grams of glacial acetic acid and twenty grams of anhydrous sodium acetate, and the mixture is poured into water, preferably after about two-thirds of the glacial acetic acid has been distilled. The separated acetyl compound may be purified from traces of unattacked base by crystallizing from hot benzene, wherein it is readily soluble. It then has the melting-point 110° centigrade. One hundred grams of the acetyl compound are then introduced, while cooling with ice, into about two hundred and fifty cubic centimeters of nitric acid of 1.51 specific gravity, whereupon the nitro compound, separated by dilution with ice, melts after recrystallization from alcohol at 96° to 97° centigrade. If an alcoholic solution of the nitro compound be heated in presence of alcoholic hydrochloric acid, ethyl-meta-nitro-para-amido benzoate is formed at once, having the melting-point 136° centigrade. It has already been described. It was obtained by Grohmann (*Ber*. 23, page 3449) by heating the ethyl ester of 4-bromo-3-nitro benzoate and by Thieme (*Ber*. 23, page 3449) by heating the corresponding para ester with alcoholic ammonia. The nitro ester is easily reduced by stannous chlorid and alcoholic hydrochloric acid to ethyl-3-4-diamido benzoate, readily soluble in alcohol, pretty easily in hot water, ether, and benzene. When recrystallized from water in presence of animal charcoal, it forms bunches of very fine white needles, melting at 111° centigrade. The analysis yielded: Calculated for

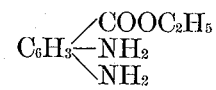

sixty per cent. C, 6.67 per cent. H, 15.56 per cent. N; found, 60.38 per cent. C, 6.85 per cent. H, 15.99 per cent. N.

Instead of the acetyl group the formyl group may be used to protect the amido group by heating the ester of para-amido-benzoic acid with concentrated formic acid and sodium formate.

Example II: The para-amido-benzoic acid may be acetylated by heating for ten hours the well-dried sodium salt or a corresponding preparation of free acid and sodium acetate with about three times the weight of gracial acetic acid. Thus a very good yield of para-acetamido-benzoic acid is obtained, which was produced by Kaiser (*Ber.* 18, 2942) with a yield of fifty per cent. by oxidizing para-acet-toluid. By nitrating with concentrated nitric acid according to Kaiser the 3-nitro-4-acet-amido-benzoic acid is obtained, and by heating thirty grams of this acid for ten hours in a reflux apparatus with about three hundred cubic centimeters of ethyl alcohol and ten grams of sulfuric acid esterification occurs with elimination of the acetyl group, and the same meta-nitro compound of the ethyl para-amido benzoate is obtained as that formed by nitrating the ester.

Example III: If nitro-acetamido-benzoic acid be heated with concentrated hydrochloric acid the 3-nitro-4-amido-benzoic acid is obtained having the melting-point 284° centigrade. To obtain the diamido acid the nitro-amido acid need not be isolated. The tin requisite for the reduction of the nitro group is directly introduced into the hydrochloric solution after deacetylization has occurred. The 3-4-diamido-benzoic acid is easily esterified by heating it with alcoholic hydrochloric acid. If, for instance, twenty grams of the former are heated for seven hours in a reflux apparatus with two hundred cubic centimeters of methyl alcohol saturated with hydrochloric acid, methyl-3-4-diamido benzoate is obtained. It has nearly the same melting-point as the ethyl ester, 108° to 109° centigrade, but is more readily soluble in cold water. It crystallizes from water in bunches of white needles. Calculated for $$C_6H_3\!\!\begin{array}{l}-COOH\\-NH_2\\-NH_2\end{array}$$

57.83 per cent. C, 6.02 per cent. H; found, 57.96 per cent. C, 6.11 per cent. H.

The new compounds are white easily-crystallizable substances readily soluble in alcohol and in ether and whose solubility in water is better than that of similar compounds hitherto described.

Having now described our invention, what we claim is—

1. The herein-described process of making alkylesters of 3-4-diamido-benzoic acid, which consists in subjecting 4-amido-benzoic acid to esterification and to nitration and subsequent reduction, the nitration taking place after conversion of the amido group into an acidyl-amido group and the reduction after elimination of the introduced acidyl group, substantially as set forth.

2. As new products the alkyl esters of 3-4-diamido-benzoic acid, which are white easily-crystallizable substances, readily soluble in alcohol and in ether, and whose solubility in water is better than that of similar compounds hitherto described.

In testimony that we claim the foregoing as our invention we have signed our names in presence of two subscribing witnesses.

EDUARD RITSERT.
WILHELM EPSTEIN.

Witnesses:
HEINRICH MUHLSCHWEIN,
JEAN GRUND.